3,676,034
EXTRUDER MIXING SCREW
Roland Norbert Wendricks, St. Charles, Ill., assignor to American Can Company, New York, N.Y.
Filed May 1, 1970, Ser. No. 33,599
Int. Cl. B29f 3/00
U.S. Cl. 425—208
5 Claims

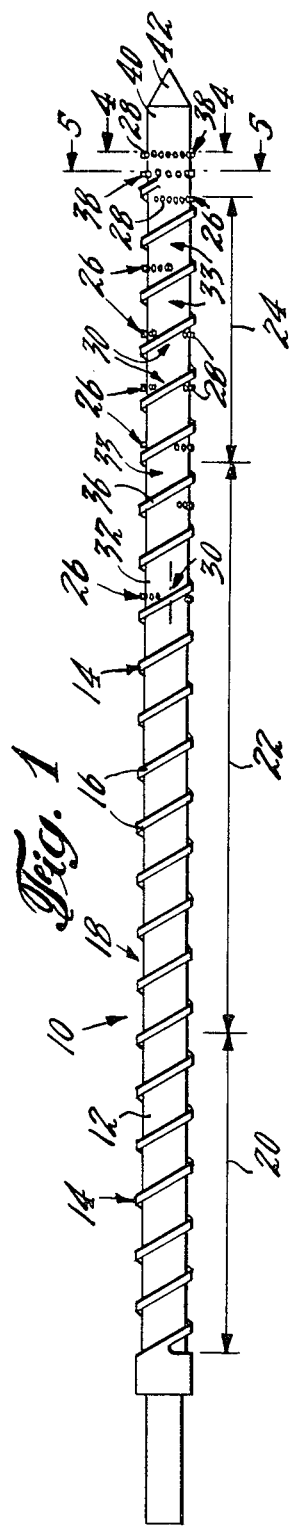
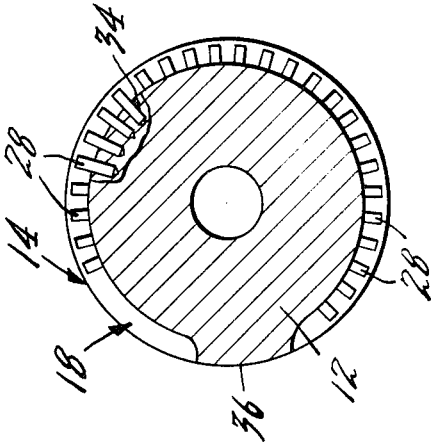
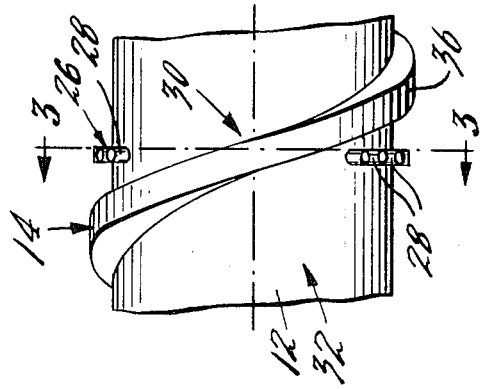
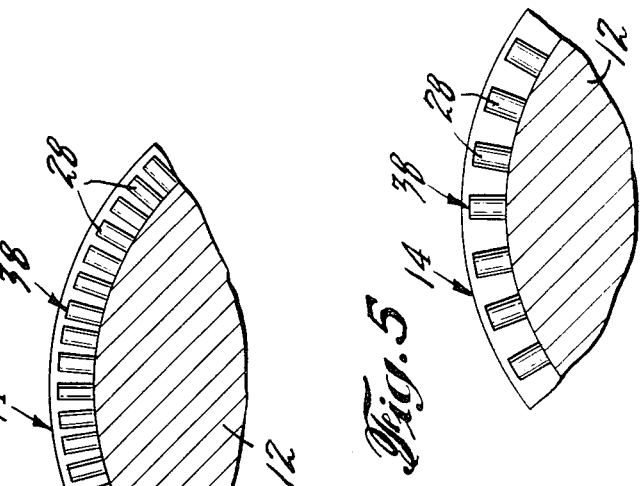
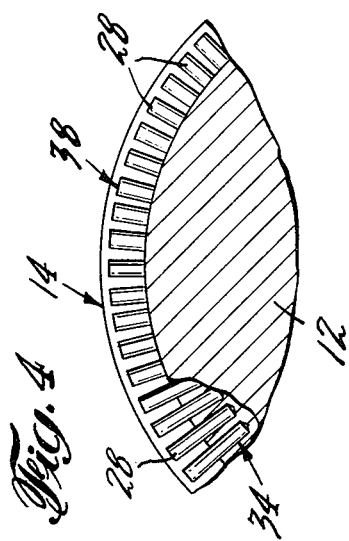
INVENTOR.
ROLAND NORBERT WENDRICKS
BY
Leonard R. Kohan
ATTORNEY ' # United States Patent Office 3,676,034
Patented July 11, 1972

ABSTRACT OF THE DISCLOSURE

A single stage extruder screw wherein, in addition to having a continuous helical flight for advancing thermoplastic material, such as food grade PVC, there is provided radial mixing pins arranged in nine circumferential rows which are axially spaced along the screw for mixing the advancing thermoplastic material. Seven of the nine rows are incomplete circumferential rows of radial pins, the rows being interrupted by the helical flight and aligned to diagonally bisect a portion of a helical channel defined by the adjacent turns of the helical flight on either side of the location at which each row is interrupted by the helical flight. Further, one complete flight turn is cut back on the extruding end of the screw thereby leaving a flightless root portion at this end of the screw. Finally, the remaining two of the nine rows are circumferentially arranged about this end of the screw at the flightless root portion and are complete rows of radial mixing pins.

BACKGROUND OF THE INVENTION

The present invention relates to extruding thermoplastic materials, and, more particularly, to a novel type of extruder screw for use in extruding thermoplastic material.

Thermoplastic extrusion consists generally of feeding a thermoplastic material, which is usually in dry particulate form, through a cylinder bore wherein the material is softened to a molten mass, and then forcing the mass through a die as an extrudate of a desired form. The cylinder is provided with a feed hopper at one end and a die at the other end. A screw, mounted for rotation in the cylinder bore, receives the particulate thermoplastic material from the hopper and forces the material along the cylinder bore and through the die. Heat supplied through the cylinder wall and generated by the working of the screw causes the thermoplastic material to become molten, or fluxed, and flow through the die as an extrudate having the desired cross sectional form.

The action of the screw, in addition to carrying the material through the cylinder bore, effects a physical blending of the thermoplastic particles and a shearing type of mixing between the fluxed material and the material particles at the cylinder bore wall and the screw flight edges. Thorough mixing and blending of the material is necessary to provide a homogeneous melt and to obtain a uniform extrudate.

In the past few years, several types of screws having mixing pins or pegs thereon have been developed, for example, as disclosed in the patents to Gwinn et al., 3,486,193 and Barr et al., 3,487,503.

In the present invention, the provision of the circumferential rows of mixing pins at various positions on the screw provides localized areas of vigorous mixing and homogenizing between substantially solid and melted portions of the thermoplastic material as the material is being advanced by the rotation of the screw. Furthermore, the provision of deep channel areas defined between successive mixing pin rows by adjacent deep flight turns in a metering section of the novel screw forming the present invention, being preferably 0.3 inch or more in depth to the screw root as compared to shallow channels of substantially less than 0.3 inch in conventional screws, allows the advancing thermoplastic material to undergo "relaxation," being subjected only to low shear mixing in these areas whereby, within these areas, heat transfers, or redistributes, from hot portions of the melted material to cooler particles intermingled therewith to promote an overall uniform lower temperature within the advancing material. As the thermoplastic material advances it can be easily seen that individual portions of the material will spend proportionately more time advancing through the deep channel areas than through the homogenizing or mixing pin areas. Therefore, the extrusion process which uses the novel screw of the present invention may fairly be characterized as an overall low shear process, even though the advancing thermoplastic material is subjected to alternating vigorous mixing and low shear movement as it is advanced by the novel screw.

Accordingly, the purpose of the present invention is to achieve a high throughput of uniform thermoplastic melt of approximately 500 lbs./hr. at a low stock temperature of approximately 385° to 390° F. for food grade PVC resin and of approximately 400° to 410° F. for general purpose PVC resin (resin not approved for food applications) without the thermoplastic material sticking to the screw or degrading.

Thus, an advantage of the present invention is the provision of a novel screw which will be able to process heat-sensitive thermoplastic materials, especially food grade PVC, at lower stock temperatures than those normally found in conventional extrusion processes to reduce the likelihood of material degradation which otherwise frequently occurs at high extrusion temperatures, but to still be able to provide thorough mixing of the heat-sensitive thermoplastic material.

Another advantage of the present invention is that since the novel screw provides for the thorough and constant mixing of the thermoplastic melt, it prevents hot spots from occurring and building up in the material against the fronts of the helical flight. Also, in this regard, the provision of a single stage screw having a constant screw diameter with a feed section of a constant flight depth, a transition section of a gradually decreasing flight depth and a metering section of a constant flight depth, there being no sharp recesses, cavities, undercuts or changes in the root diameter profile, nor in the flight depths, prevents holdup in the flow of the thermoplastic material being advanced through the extrusion process by the screw and thereby decreases the opportunity for material degradation. Thus, the root diameter profile of the extruder screw of the present invention provides a smooth path of travel for the advancing thermoplastic material.

A further important advantage of the present invention is that the radial mixing pins act to strain out and hold any unmelted lumps of thermoplastic material until the other molten material "washes" it and mixes it back into the molten stream.

Also practical experience has shown that when the last turn of the helical flight of the screw runs substantially to the edge of the extruding end of the screw, the thermoplastic material being extruded is not uniform in temperature, and, consequently, the extrudate being formed will manifest this undesirable condition in the formation of "temperature lines" visibly present in the surface grain of the extrudate. Therefore, in the present invention, one complete turn of the helical flight is cut back on the extruding end of the screw. This leaves a flightless root portion at the extruding end of the screw with the desirable result that all the thermoplastic melt comes together sooner and thereby has more time, preliminary to the melt being extruded, to redistribute its heat, or, in another sense, to eliminate any sharp temperature differentials across the material, so that the material is extruded at a uniform temperature which, in turn, means that a uniform extrudate is produced.

SUMMARY OF THE INVENTION

The present invention relates to a novel type of extruder mixing screw wherein, in addition to having a conventional helical flight for advancing thermoplastic material, there is provided radially extending pins arranged in a plurality of circumferential rows axially spaced at various locations along the screw root. The pins provide the means for fluxing the thermoplastic material and producing thorough mixing thereof at low stock temperatures which reduces the likelihood of material degradation. Further, one complete turn of the helical flight is cut back from the extruding end of the screw leaving a flightless root portion at this end of the screw, with the desirable result that the extruded melt will be of a more uniform temperature. At least one of the plurality of rows constitutes an incomplete circumferential row of radial pins, the one row being interrupted by a turn of the helical flight, since the one row is positioned to diagonally bisect a portion of the helical channel defined by adjacent turns of the helical flight on either side of the location at which said flight turn interrupts the one row. Further, at least one of the plurality of rows constitutes a complete circumferential row of radial pins, the one row being located about the flightless root portion where the one complete turn of the helical flight has been cut back.

BRIEF DESCRIPTION OF THE DRAWINGS

FIG. 1 is a side elevational view of the extruder screw forming the present invention.

FIG. 2 is an enlarged fragmentary side elevational view illustrating one of the incomplete circumferential rows of radially extending pins on the extruder screw.

FIG. 3 is a sectional view taken substantially along line 3—3 of FIG. 2 with a portion broken away to show an elevational view of the embedded radial pins.

FIG. 4 is an enlarged fragmentary sectional view taken substantially along line 4—4 of FIG. 1 illustrating one of the complete circumferential rows of radially extending pins on the extruder screw with a portion broken away to show an elevational view of the embedded radial pins.

FIG. 5 is an enlarged fragmentary sectional view taken substantially along line 5—5 of FIG. 1 illustrating the other of the complete circumferential rows of radially extedning pins on the extruder screw.

DETAILED DESCRIPTION OF THE PREFERRED EMBODIMENT

FIG. 1 illustrates an extruder screw, generally designated 10, having a root 12 with a single continuous helical flight, generally designated 14, extending for substantially the entire length of the screw root 12. One turn 16 of the helical flight 14 is that unit part thereof which extends for 360° around, or for one revolution of, the screw root 12. All of the adjacent turns 16 of the helical flight 14 define a channel, generally designated 18, through which thermoplastic material passes during the extrusion process. The screw 10 comprises a single stage extruder screw of a constant screw diameter with a feed section 20 having flight turns 16 of a constant depth thereon, a transition section 22 having flight turns 16 of a gradually decreasing depth thereon and a metering section 24 having flight turns 16 of a constant depth thereon.

A plurality of incomplete circumferential rows, generally designated 26, of cylindrical radially extending pins 28, are axially spaced from along the front end of the transition section 22 through the entire metering section 24 of the extruder screw 10 as shown in FIG. 1. The plurality of incomplete circumferential rows 26 of pins 28 extend radially from the root 12 in planes which are perpendicular to the axis of the root 12. In the preferred embodiment of the present invention illustrated in FIG. 1, the circumferential pin spacings, as well as pin sizes, are the same from row to row of the incomplete rows 26. The distance taken axially along the root 12 between successive incomplete rows 26 of pins 28 is substantially the same from row to row for all except between the innermost two rows 26 along the screw, but is greater than the distance covered by one flight turn 16 taken along the axis of the root 12 and less than the distance covered by two flight turns 16 taken along the axis of the root 12. The distance between successive incomplete rows 26, in alternative embodiments of the present invention, may be substantially equal to one and one-half times the distance covered by one flight turn 16 taken along the axis of the root 12.

As shown in FIGS. 2 and 3, each of the incomplete rows 26 is interrupted at one location, generally designated 30, around its perimeter by the helical flight 14. Further, each of the incomplete rows 26 is aligned to diagonally bisect a channel portion, generally designated 32, which is defined by the two adjacent turns 16 of the continuous helical flight 14 on either side of an axial line (see the broken axial line in FIGS. 1 and 2) through the location 30 at which the flight 14 interrupts each incomplete row 26. Each of the channel portions 32, diagonally bisected by an incomplete row 26, is separate and distinct from all the other channel portions 32. Also, as shown in FIG. 1, deep channel areas, generally designated 33, are defined between successive incomplete rows 26 of mixing pins 28 by adjacent flight turns 16 having a depth to the root 12 of preferably 0.3 inch or more.

As illustrated in FIGS. 3 and 4, the cylindrical pins 28 are embedded in radial holes 34 drilled into the root 12 of the screw 10 at greater depths than the height of the pins 28 about the root 12. The pins 28 extend outwardly from the root 12 through a distance which is slightly less than or equal to the distance through which the helical flight 14 extends which is outwardly from the root 12 to a surface of revolution (not illustrated) which is swept by the top surface 36 of the flight during the extrusion process and which is concentric with the longitudinal axis of the root 12.

A plurality of complete circumferential rows, generally designated 38, preferably two such rows, of cylindrical radially extending mixing pins 28, are axially spaced along a flightless root section 40 adjacent to the extruding end of the screw 10. At this end of the screw 10, the helical flight 14 has been cut back by one complete turn 16. Therefore, the complete rows 38 are comprised of radial pins 28 symmetrically arranged completely about the circumference of the root 12. FIGS. 4 and 5 show relative pin positions of portions of the rows 38.

The following example will serve to further illustrate the present invention.

Example

The extruder screw, as illustrated in FIG. 1, has a constant screw diameter of 4.5 inches. The feed section 20 is 31½ inches long and has a constant flight depth of 0.6 inch. The transition section 22 is 49½ inches long and has a flight depth which gradually decreases from 0.6 to 0.3 inch. The metering section 24 is 23⅟₁₆ inches long and has a constant flight depth of 0.3 inch. The metering section ends 7⅚₁₆ inches before the end of the screw root 12 at the extruding end of the screw 10 whereat a screw tip 42 is 4⅞₁₆ inches long. The incomplete rows 26 which are each comprised of twenty-six cylindrical radially extending pins 28 are 6 inches apart except for a distance of 10 inches between the two incomplete rows 26 located within the transition section 22 of the screw 10. The complete rows 38, which are comprised of thirty-six and fifty-one cylindrical radially extending pins 28, respectively, with the row 38 having the greater number of pins 28 being located nearer to the screw tip 42, are located about the flightless root section 40. The complete row 38 with thirty-six radial pins 28, located adjacent the place where the helical flight 14 terminates, is three inches from the outermost incomplete row 26 and one and one-half inches from the outermost complete row 38 which has fifty-one radial pins 28. The cylindrical pins 28 have a 0.187 inch diameter and a 11/16 inch length.

It must be understood that circumferential rows of radially extending pins 28 axially spaced along the screw root 12 varied in their circumferential pin to pin spacing and axially-measured row to row spacing, as well as individual pin size, for different screws to be used in the extrusion of different thermoplastic materials, alternatively embody the principles of the present invention.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred or exemplary embodiment thereof.

I claim:

1. A mixing screw for working heat-sensitive thermoplastic material, such as PVC, through an extrusion process, comprising:
   a root;
   a continuous helical flight extending outwardly from said root with all of the adjacent turns of said helical flight defining a channel for the passage of thermoplastic material; and
   a plurality of rows of mixing pins, said mixing pins extending radially from said root through a distance which is slightly less than or equal to the distance through which said helical flight extends from said root, each of said rows extending circumferentially about said root in planes which are perpendicular to the axis of said root, more than one of said plurality of rows being interrupted by said continuous helical flight, and each of said interrupted rows diagonally bisecting a separate portion of the channel as defined by the two adjacent turns of said continuous helical flight on either side of the location where said flight interrupts each of said interrupted rows of mixing pins.

2. A mixing screw according to claim 1, wherein said root further includes a flightless section at the extruding end of the screw of a length at least equal to the length of one turn of said helical flight.

3. A mixing screw according to claim 2, wherein at least one of said plurality of rows of mixing pins radially extends from said flightless root section.

4. A mixing screw according to claim 1, wherein said plurality of interrupted rows of mixing pins are spaced axially along said root one from the next by a distance greater than the distance covered by one flight turn taken axially along said root but less than the distance covered by two flight turns taken axially along said root.

5. A mixing screw according to claim 1, wherein a majority of said plurality of interrupted rows of mixing pins are axially spaced along said root throughout a metering section of said root and deep channel areas are defined between said interrupted rows by adjacent flight turns having a depth to said root of 0.3 inch or more.

References Cited

UNITED STATES PATENTS

| | | | |
|---|---|---|---|
| 2,838,794 | 6/1958 | Munger et al. | 18—12 SM |
| 3,391,051 | 6/1968 | Ehrenfreund et al. | 18—12 SN X |
| 3,487,503 | 1/1970 | Barr et al. | 18—12 SM |
| 3,486,193 | 12/1969 | Gwinn et al. | 18—12 SM |

H. A. KILBY, JR., Primary Examiner

U.S. Cl. X.R.

425—376